(12) United States Patent
Pasquero et al.

(10) Patent No.: US 9,524,290 B2
(45) Date of Patent: Dec. 20, 2016

(54) SCORING PREDICTIONS BASED ON PREDICTION LENGTH AND TYPING SPEED

(75) Inventors: Jerome Pasquero, Montreal (CA); Jason Tyler Griffin, Kitchener (CA); Donald Somerset McCulloch McKenzie, Waterloo (CA)

(73) Assignee: BlackBerry Limited, Waterloo, Ontario (CA)

( * ) Notice: Subject to any disclaimer, the term of this patent is extended or adjusted under 35 U.S.C. 154(b) by 312 days.

(21) Appl. No.: 13/601,864

(22) Filed: Aug. 31, 2012

(65) Prior Publication Data

US 2014/0067372 A1 Mar. 6, 2014

(51) Int. Cl.
*G06F 17/27* (2006.01)

(52) U.S. Cl.
CPC .................................. *G06F 17/276* (2013.01)

(58) Field of Classification Search
CPC .............................. G06F 3/0237; H03M 11/10
USPC .......................................................... 704/9
See application file for complete search history.

(56) References Cited

U.S. PATENT DOCUMENTS

| | | | |
|---|---|---|---|
| 3,872,433 A | 3/1975 | Holmes et al. | |
| 4,408,302 A | 10/1983 | Fessel et al. | |
| 5,261,009 A | 11/1993 | Bokser | |
| 5,664,127 A | 9/1997 | Anderson et al. | |
| 5,761,689 A * | 6/1998 | Rayson et al. | 715/210 |
| 5,832,528 A | 11/1998 | Kwatinetz et al. | |
| 5,963,671 A | 10/1999 | Comerford et al. | |
| 6,002,390 A | 12/1999 | Masui | |
| 6,061,340 A | 5/2000 | Martin et al. | |
| 6,094,197 A | 7/2000 | Buxton et al. | |
| 6,223,059 B1 | 4/2001 | Haestrup | |
| 6,226,299 B1 | 5/2001 | Henson | |
| 6,351,634 B1 | 2/2002 | Shin | |
| 6,421,453 B1 | 7/2002 | Kanevsky et al. | |
| 6,573,844 B1 | 6/2003 | Venolia et al. | |
| 6,621,424 B1 | 9/2003 | Brand | |
| 6,646,572 B1 | 11/2003 | Brand | |
| 6,801,190 B1 | 10/2004 | Robinson et al. | |
| 7,061,403 B2 | 6/2006 | Fux | |
| 7,098,896 B2 | 8/2006 | Kushler et al. | |
| 7,107,204 B1 | 9/2006 | Liu et al. | |
| 7,216,588 B2 | 5/2007 | Suess | |
| 7,259,752 B1 | 8/2007 | Simmons | |

(Continued)

FOREIGN PATENT DOCUMENTS

| | | |
|---|---|---|
| CA | 2688204 A1 | 7/2010 |
| CA | 2812457 A1 | 10/2013 |

(Continued)

OTHER PUBLICATIONS

"Features Included in the T-Mobile G1", http://www.t-mobileg1.com/T-Mobile-G1-Features.pdf, 2009.

(Continued)

*Primary Examiner* — Jakieda Jackson
(74) *Attorney, Agent, or Firm* — Fish & Richardson P.C.

(57) ABSTRACT

A method that includes receiving an input, determining, by the processor, a likelihood that a predicted string associated with the received input matches an intended input string, where the determination is a function of at least one of a length of the predicted string and a typing speed associated with the received input, and displaying the predicted string.

12 Claims, 3 Drawing Sheets

(56) References Cited

U.S. PATENT DOCUMENTS

| | | |
|---|---|---|
| 7,277,088 B2 | 10/2007 | Robinson et al. |
| 7,292,226 B2 | 11/2007 | Matsuura et al. |
| 7,382,358 B2 | 6/2008 | Kushler et al. |
| 7,394,346 B2 | 7/2008 | Bodin |
| 7,443,316 B2 | 10/2008 | Lim |
| 7,479,949 B2 | 1/2009 | Jobs et al. |
| 7,487,461 B2 | 2/2009 | Zhai et al. |
| 7,526,316 B2 | 4/2009 | Shimizu |
| 7,530,031 B2 | 5/2009 | Iwamura et al. |
| 7,539,472 B2 | 5/2009 | Sloo |
| 7,661,068 B2 | 2/2010 | Lund |
| 7,671,765 B2 | 3/2010 | Fux |
| 7,698,127 B2 | 4/2010 | Trower, II et al. |
| 7,886,233 B2 | 2/2011 | Rainisto et al. |
| 7,934,156 B2 | 4/2011 | Forstall et al. |
| 8,023,930 B2 | 9/2011 | Won |
| 8,059,101 B2 | 11/2011 | Westerman et al. |
| 8,065,624 B2 | 11/2011 | Morin et al. |
| 8,201,087 B2 | 6/2012 | Kay et al. |
| 8,225,203 B2 | 7/2012 | Unruh |
| 8,289,283 B2 | 10/2012 | Kida et al. |
| 8,326,358 B2 | 12/2012 | Runstedler et al. |
| 8,490,008 B2 | 7/2013 | Griffin et al. |
| 8,516,386 B2 | 8/2013 | Adam et al. |
| 8,542,206 B2 | 9/2013 | Westerman et al. |
| 2002/0080186 A1 | 6/2002 | Frederiksen |
| 2002/0097270 A1 | 7/2002 | Keely et al. |
| 2002/0154037 A1 | 10/2002 | Houston |
| 2002/0180797 A1 | 12/2002 | Bachmann |
| 2004/0111475 A1 | 6/2004 | Schultz |
| 2004/0135818 A1 | 7/2004 | Thomson et al. |
| 2004/0140956 A1 | 7/2004 | Kushler et al. |
| 2004/0153963 A1 | 8/2004 | Simpson et al. |
| 2004/0168131 A1* | 8/2004 | Blumberg .................. 715/534 |
| 2004/0201576 A1 | 10/2004 | Shimada et al. |
| 2005/0017954 A1 | 1/2005 | Kay et al. |
| 2005/0024341 A1 | 2/2005 | Gillespie et al. |
| 2005/0039137 A1 | 2/2005 | Bellwood et al. |
| 2005/0052425 A1 | 3/2005 | Zadesky et al. |
| 2005/0093826 A1 | 5/2005 | Huh |
| 2005/0162407 A1 | 7/2005 | Sakurai et al. |
| 2005/0195173 A1 | 9/2005 | McKay |
| 2005/0244208 A1 | 11/2005 | Suess |
| 2005/0275632 A1 | 12/2005 | Pu et al. |
| 2005/0283358 A1 | 12/2005 | Stephanick et al. |
| 2006/0022947 A1 | 2/2006 | Griffin et al. |
| 2006/0026521 A1 | 2/2006 | Hotelling et al. |
| 2006/0033724 A1 | 2/2006 | Chaudhri et al. |
| 2006/0053387 A1 | 3/2006 | Ording |
| 2006/0176283 A1 | 8/2006 | Suraqui |
| 2006/0209040 A1 | 9/2006 | Garside et al. |
| 2006/0239562 A1 | 10/2006 | Bhattacharyay et al. |
| 2006/0253793 A1 | 11/2006 | Zhai et al. |
| 2006/0265648 A1 | 11/2006 | Rainisto et al. |
| 2006/0265668 A1 | 11/2006 | Rainisto |
| 2006/0279548 A1 | 12/2006 | Geaghan |
| 2007/0015534 A1 | 1/2007 | Shimizu |
| 2007/0046641 A1 | 3/2007 | Lim |
| 2007/0061753 A1 | 3/2007 | Ng et al. |
| 2007/0150842 A1 | 6/2007 | Chaudhri et al. |
| 2007/0156394 A1 | 7/2007 | Banerjee et al. |
| 2007/0157085 A1 | 7/2007 | Peters |
| 2007/0229476 A1 | 10/2007 | Huh |
| 2007/0256029 A1 | 11/2007 | Maxwell |
| 2007/0263932 A1 | 11/2007 | Bernardin et al. |
| 2008/0033713 A1 | 2/2008 | Brostrom |
| 2008/0100581 A1 | 5/2008 | Fux |
| 2008/0122796 A1 | 5/2008 | Jobs et al. |
| 2008/0126387 A1 | 5/2008 | Blinnikka |
| 2008/0136587 A1 | 6/2008 | Orr |
| 2008/0141125 A1 | 6/2008 | Ghassabian |
| 2008/0158020 A1 | 7/2008 | Griffin |
| 2008/0168366 A1 | 7/2008 | Kocienda et al. |
| 2008/0184360 A1 | 7/2008 | Kornilovsky et al. |
| 2008/0189605 A1 | 8/2008 | Kay et al. |
| 2008/0195388 A1 | 8/2008 | Bower et al. |
| 2008/0231610 A1 | 9/2008 | Hotelling et al. |
| 2008/0259040 A1 | 10/2008 | Ording et al. |
| 2008/0266261 A1 | 10/2008 | Idzik |
| 2008/0273013 A1 | 11/2008 | Levine et al. |
| 2008/0281583 A1 | 11/2008 | Slothouber et al. |
| 2008/0304890 A1 | 12/2008 | Shin et al. |
| 2008/0309644 A1 | 12/2008 | Arimoto |
| 2008/0316183 A1 | 12/2008 | Westerman et al. |
| 2008/0318635 A1 | 12/2008 | Yoon et al. |
| 2009/0002326 A1 | 1/2009 | Pihlaja |
| 2009/0006991 A1 | 1/2009 | Lindberg et al. |
| 2009/0025089 A1 | 1/2009 | Martin et al. |
| 2009/0058823 A1 | 3/2009 | Kocienda |
| 2009/0058830 A1 | 3/2009 | Herz et al. |
| 2009/0066668 A1 | 3/2009 | Kim et al. |
| 2009/0077464 A1 | 3/2009 | Goldsmith et al. |
| 2009/0085881 A1 | 4/2009 | Keam |
| 2009/0094562 A1 | 4/2009 | Jeong et al. |
| 2009/0125848 A1 | 5/2009 | Keohane et al. |
| 2009/0132576 A1 | 5/2009 | Miller et al. |
| 2009/0144667 A1 | 6/2009 | Christoffersson et al. |
| 2009/0150785 A1 | 6/2009 | Asami et al. |
| 2009/0160800 A1 | 6/2009 | Liu et al. |
| 2009/0167700 A1 | 7/2009 | Westerman et al. |
| 2009/0174667 A1 | 7/2009 | Kocienda et al. |
| 2009/0193334 A1 | 7/2009 | Assadollahi |
| 2009/0213081 A1 | 8/2009 | Case, Jr. |
| 2009/0228792 A1 | 9/2009 | Van Os et al. |
| 2009/0228842 A1 | 9/2009 | Westerman et al. |
| 2009/0237361 A1 | 9/2009 | Mosby et al. |
| 2009/0240949 A9* | 9/2009 | Kitchens et al. ............. 713/183 |
| 2009/0247112 A1 | 10/2009 | Lundy et al. |
| 2009/0251410 A1 | 10/2009 | Mori et al. |
| 2009/0254818 A1 | 10/2009 | Jania et al. |
| 2009/0259962 A1 | 10/2009 | Beale |
| 2009/0265669 A1 | 10/2009 | Kida et al. |
| 2009/0267909 A1 | 10/2009 | Chen et al. |
| 2009/0284471 A1 | 11/2009 | Longe et al. |
| 2009/0295737 A1 | 12/2009 | Goldsmith et al. |
| 2009/0307768 A1 | 12/2009 | Zhang et al. |
| 2009/0313693 A1 | 12/2009 | Rogers |
| 2010/0020033 A1 | 1/2010 | Nwosu |
| 2010/0020036 A1 | 1/2010 | Hui et al. |
| 2010/0026650 A1 | 2/2010 | Srivastava et al. |
| 2010/0045705 A1 | 2/2010 | Vertegaal et al. |
| 2010/0050121 A1 | 2/2010 | Shin |
| 2010/0052880 A1 | 3/2010 | Laitinen |
| 2010/0070908 A1 | 3/2010 | Mori et al. |
| 2010/0079413 A1 | 4/2010 | Kawashima et al. |
| 2010/0095238 A1 | 4/2010 | Baudet |
| 2010/0097321 A1 | 4/2010 | Son et al. |
| 2010/0115402 A1 | 5/2010 | Knaven et al. |
| 2010/0127991 A1 | 5/2010 | Yee |
| 2010/0131900 A1 | 5/2010 | Spetalnick |
| 2010/0141590 A1 | 6/2010 | Markiewicz et al. |
| 2010/0156813 A1 | 6/2010 | Duarte et al. |
| 2010/0156818 A1 | 6/2010 | Burrough et al. |
| 2010/0161538 A1 | 6/2010 | Kennedy, Jr. et al. |
| 2010/0192086 A1 | 7/2010 | Kocienda et al. |
| 2010/0197352 A1 | 8/2010 | Runstedler et al. |
| 2010/0199176 A1 | 8/2010 | Chronqvist |
| 2010/0225599 A1 | 9/2010 | Danielsson et al. |
| 2010/0235726 A1 | 9/2010 | Ording et al. |
| 2010/0253620 A1 | 10/2010 | Singhal |
| 2010/0257478 A1 | 10/2010 | Longe et al. |
| 2010/0257490 A1 | 10/2010 | Lyon et al. |
| 2010/0259482 A1 | 10/2010 | Ball |
| 2010/0259561 A1 | 10/2010 | Forutanpour et al. |
| 2010/0265181 A1 | 10/2010 | Shore |
| 2010/0269040 A1 | 10/2010 | Lee |
| 2010/0277424 A1 | 11/2010 | Chang et al. |
| 2010/0287486 A1 | 11/2010 | Coddington |
| 2010/0292984 A1 | 11/2010 | Huang et al. |
| 2010/0293475 A1 | 11/2010 | Nottingham et al. |
| 2010/0295801 A1 | 11/2010 | Bestle et al. |
| 2010/0313127 A1 | 12/2010 | Gosper et al. |
| 2010/0313158 A1 | 12/2010 | Lee et al. |
| 2010/0315266 A1 | 12/2010 | Gunawardana et al. |

(56) References Cited

U.S. PATENT DOCUMENTS

| | | |
|---|---|---|
| 2010/0325721 A1 | 12/2010 | Bandyopadhyay et al. |
| 2010/0333027 A1 | 12/2010 | Martensson et al. |
| 2011/0010655 A1 | 1/2011 | Dostie et al. |
| 2011/0018812 A1 | 1/2011 | Baird |
| 2011/0029862 A1 | 2/2011 | Scott et al. |
| 2011/0035696 A1 | 2/2011 | Elazari et al. |
| 2011/0041056 A1 | 2/2011 | Griffin et al. |
| 2011/0043455 A1 | 2/2011 | Roth et al. |
| 2011/0060984 A1 | 3/2011 | Lee |
| 2011/0061029 A1 | 3/2011 | Yeh et al. |
| 2011/0063231 A1 | 3/2011 | Jakobs et al. |
| 2011/0074704 A1 | 3/2011 | Causey et al. |
| 2011/0078563 A1* | 3/2011 | Archer .................. 715/261 |
| 2011/0078613 A1 | 3/2011 | Bangalore |
| 2011/0086674 A1 | 4/2011 | Rider et al. |
| 2011/0090151 A1 | 4/2011 | Huang et al. |
| 2011/0099505 A1 | 4/2011 | Dahl |
| 2011/0099506 A1 | 4/2011 | Gargi et al. |
| 2011/0119623 A1 | 5/2011 | Kim |
| 2011/0148572 A1 | 6/2011 | Ku |
| 2011/0171617 A1 | 7/2011 | Yeh et al. |
| 2011/0179355 A1 | 7/2011 | Karlsson |
| 2011/0193797 A1 | 8/2011 | Unruh |
| 2011/0201387 A1 | 8/2011 | Paek et al. |
| 2011/0202835 A1 | 8/2011 | Jakobsson et al. |
| 2011/0202876 A1 | 8/2011 | Badger et al. |
| 2011/0209087 A1 | 8/2011 | Guyot-Sionnest |
| 2011/0233407 A1 | 9/2011 | Wu et al. |
| 2011/0239153 A1 | 9/2011 | Carter et al. |
| 2011/0242138 A1 | 10/2011 | Tribble |
| 2011/0248945 A1 | 10/2011 | Higashitani |
| 2011/0249076 A1 | 10/2011 | Zhou et al. |
| 2011/0256848 A1 | 10/2011 | Bok et al. |
| 2011/0285656 A1 | 11/2011 | Yaksick et al. |
| 2011/0302518 A1 | 12/2011 | Zhang |
| 2011/0305494 A1 | 12/2011 | Kang |
| 2012/0005576 A1 | 1/2012 | Assadollahi |
| 2012/0023447 A1 | 1/2012 | Hoshino et al. |
| 2012/0029910 A1 | 2/2012 | Medlock et al. |
| 2012/0030566 A1 | 2/2012 | Victor |
| 2012/0030623 A1 | 2/2012 | Hoellwarth |
| 2012/0030624 A1 | 2/2012 | Migos |
| 2012/0036469 A1 | 2/2012 | Suraqui |
| 2012/0053887 A1 | 3/2012 | Nurmi |
| 2012/0062465 A1 | 3/2012 | Spetalnick |
| 2012/0062494 A1 | 3/2012 | Hsieh et al. |
| 2012/0068937 A1 | 3/2012 | Backlund et al. |
| 2012/0079373 A1 | 3/2012 | Kocienda et al. |
| 2012/0084734 A1 | 4/2012 | Wilairat |
| 2012/0092278 A1 | 4/2012 | Yamano |
| 2012/0110518 A1 | 5/2012 | Chan et al. |
| 2012/0117506 A1 | 5/2012 | Koch et al. |
| 2012/0119997 A1 | 5/2012 | Gutowitz |
| 2012/0136897 A1* | 5/2012 | Kawauchi .................. 707/780 |
| 2012/0149477 A1 | 6/2012 | Park et al. |
| 2012/0159317 A1 | 6/2012 | Di Cocco et al. |
| 2012/0162081 A1 | 6/2012 | Stark |
| 2012/0166696 A1 | 6/2012 | Kallio et al. |
| 2012/0167009 A1 | 6/2012 | Davidson et al. |
| 2012/0223959 A1 | 9/2012 | Lengeling |
| 2012/0306772 A1 | 12/2012 | Tan et al. |
| 2012/0311437 A1 | 12/2012 | Weeldreyer et al. |
| 2013/0007606 A1 | 1/2013 | Dolenc |
| 2013/0050222 A1* | 2/2013 | Moran et al. .................. 345/467 |
| 2013/0061317 A1 | 3/2013 | Runstedler et al. |
| 2013/0063356 A1 | 3/2013 | Martisauskas |
| 2013/0067382 A1* | 3/2013 | Townsend et al. .......... 715/773 |
| 2013/0067411 A1 | 3/2013 | Kataoka et al. |
| 2013/0104068 A1 | 4/2013 | Murphy et al. |
| 2013/0120266 A1 | 5/2013 | Griffin et al. |
| 2013/0120267 A1 | 5/2013 | Pasquero et al. |
| 2013/0120268 A1 | 5/2013 | Griffin et al. |
| 2013/0125034 A1 | 5/2013 | Griffin et al. |
| 2013/0125036 A1 | 5/2013 | Griffin et al. |
| 2013/0125037 A1 | 5/2013 | Pasquero et al. |
| 2013/0176228 A1 | 7/2013 | Griffin et al. |
| 2013/0187858 A1 | 7/2013 | Griffin et al. |
| 2013/0187868 A1 | 7/2013 | Griffin et al. |
| 2013/0222249 A1 | 8/2013 | Pasquero et al. |
| 2013/0222255 A1 | 8/2013 | Pasquero et al. |
| 2013/0222256 A1 | 8/2013 | Pasquero et al. |
| 2013/0246329 A1 | 9/2013 | Pasquero et al. |
| 2013/0263038 A1 | 10/2013 | Griffin et al. |
| 2013/0271375 A1 | 10/2013 | Griffin et al. |
| 2013/0271385 A1 | 10/2013 | Griffin et al. |
| 2013/0275923 A1 | 10/2013 | Griffin et al. |
| 2013/0285916 A1 | 10/2013 | Griffin et al. |
| 2013/0285927 A1 | 10/2013 | Pasquero et al. |
| 2013/0285928 A1 | 10/2013 | Thorsander |
| 2013/0285930 A1 | 10/2013 | Thorsander et al. |
| 2013/0290906 A1 | 10/2013 | Thorsander |
| 2013/0314331 A1 | 11/2013 | Rydenhag et al. |
| 2013/0342452 A1 | 12/2013 | Kuo et al. |
| 2014/0002363 A1 | 1/2014 | Griffin et al. |
| 2014/0062886 A1 | 3/2014 | Pasquero et al. |
| 2014/0062923 A1 | 3/2014 | Thorsander et al. |
| 2014/0063067 A1 | 3/2014 | Compton et al. |
| 2014/0067372 A1 | 3/2014 | Pasquero et al. |
| 2014/0164977 A1* | 6/2014 | Spetalnick .................. 715/773 |

FOREIGN PATENT DOCUMENTS

| | | |
|---|---|---|
| CA | 2813393 A1 | 10/2013 |
| CA | 2819839 A1 | 12/2013 |
| CA | 2820997 A1 | 1/2014 |
| CN | 101021762 A | 8/2007 |
| EP | 0844571 A2 | 5/1998 |
| EP | 0880090 A2 | 11/1998 |
| EP | 0880090 A3 | 11/1998 |
| EP | 1847917 A2 | 10/2007 |
| EP | 1847917 A3 | 10/2007 |
| EP | 1850217 A2 | 10/2007 |
| EP | 1909161 A1 | 4/2008 |
| EP | 1939715 A1 | 7/2008 |
| EP | 1942398 A1 | 7/2008 |
| EP | 2077491 A1 | 7/2009 |
| EP | 2109046 A1 | 10/2009 |
| EP | 2128750 A2 | 12/2009 |
| EP | 2146271 A2 | 1/2010 |
| EP | 2184686 A1 | 5/2010 |
| EP | 2214118 A1 | 8/2010 |
| EP | 2256614 A1 | 12/2010 |
| EP | 2282252 A1 | 2/2011 |
| EP | 2293168 A1 | 3/2011 |
| EP | 2320312 A1 | 5/2011 |
| EP | 2336851 A2 | 6/2011 |
| EP | 2381384 A1 | 10/2011 |
| EP | 2386976 A1 | 11/2011 |
| EP | 2402846 A2 | 1/2012 |
| EP | 2420925 A2 | 2/2012 |
| EP | 2431842 A2 | 3/2012 |
| EP | 2400426 B1 | 3/2013 |
| EP | 2618248 A1 | 7/2013 |
| EP | 2631758 A1 | 8/2013 |
| EP | 2653955 A1 | 10/2013 |
| EP | 2660697 A1 | 11/2013 |
| EP | 2660699 A1 | 11/2013 |
| EP | 2660727 A1 | 11/2013 |
| EP | 2703955 A1 | 3/2014 |
| EP | 2703956 A1 | 3/2014 |
| EP | 2703957 A1 | 3/2014 |
| EP | 2660696 B1 | 6/2014 |
| JP | 2011-197782 A | 10/2011 |
| JP | 2012-68963 A | 4/2012 |
| KR | 20120030652 A | 3/2012 |
| WO | 03/029950 A2 | 4/2003 |
| WO | 03/054681 A1 | 7/2003 |
| WO | 2004/001560 A1 | 12/2003 |
| WO | 2005/064587 A2 | 7/2005 |
| WO | 2006/100509 A2 | 9/2006 |
| WO | 2007/068505 A1 | 6/2007 |
| WO | 2007/076210 A1 | 7/2007 |
| WO | 2007/134433 A1 | 11/2007 |
| WO | 2008/030974 A1 | 3/2008 |

(56) References Cited

FOREIGN PATENT DOCUMENTS

| WO | WO2008/057785 A2 | 5/2008 |
|---|---|---|
| WO | 2008/085741 A2 | 7/2008 |
| WO | 2009/019546 A2 | 2/2009 |
| WO | 2010/035574 A1 | 4/2010 |
| WO | 2010/035585 A1 | 4/2010 |
| WO | WO2010/035574 A1 | 4/2010 |
| WO | 2010/099835 A1 | 9/2010 |
| WO | WO2010/112841 A1 | 10/2010 |
| WO | 2011/073992 A2 | 6/2011 |
| WO | WO2011/073992 A2 | 6/2011 |
| WO | 2011/098925 A1 | 8/2011 |
| WO | WO2011/113057 A1 | 9/2011 |
| WO | 2012/043932 A1 | 4/2012 |
| WO | 2013/163718 A1 | 11/2013 |
| WO | 2013/164013 A1 | 11/2013 |

OTHER PUBLICATIONS

BlackBerry Seeker—Freeware—Pattern Lock v1.0.7, http://www.blackberryseeker.com/applications/preview/Pattern-Lock-v107.aspx, Jul. 28, 2009.

Chong et al., Exploring the Use of Discrete Gestures for Authentication, IFIP International Federation for Information Processing, 2009.

Conveniently select text, images, annotations, etc. in a PDF or any other text format on a touch based mobile/tablet device, IP.com Journal, Mar. 1, 2011, XP013142665, (10 pages).

DROID X by Motorola © 2010 Screen shots.

DROID X by Motorola © 2010 User Manual (72 pages).

European Search Report dated Feb. 28, 2011, issued in European Patent Application No. 10160590.5.

Extended European Search Report dated Aug. 24, 2012, issued in European Application No. 12166115.1 (5 pages).

Extended European Search Report dated Aug. 31, 2012, issued in European Application No. 12166170.6 (7 pages).

Extended European Search Report dated Oct. 9, 2012, issued in European Application No. 12166244.9 (6 pages).

Extended European Search Report dated Sep. 10, 2012, issued in European Application No. 12166246.4 (6 pages).

Extended European Search Report dated Sep. 10, 2012, issued in European Application No. 12166247.2 (8 pages).

Extended European Search Report dated Sep. 21, 2012, issued in European Application No. 12164240.9 (6 pages).

Extended European Search Report dated Sep. 25, 2012, issued in European Application No. 11192713.3 (7 pages).

Extended European Search Report dated Sep. 3, 2012, issued in European Application No. 12164300.1 (7 pages).

Google Mobile Help - Editing text, http://support.google.com/mobile/bin/answer.py?hl=en&answer=168926, date of access: Jun. 6, 2012 (2 pages).

GSMArena - Samsung announce s5600 & s5230 full touch midrange phones, http://www.gsmarena.com/samsung_announce_s5600_and_s5230_full_touch_midrange_phones-news-825.php, Mar. 10, 2009.

Hardware Sphere—Samsung s5600 & s5230 Touchscreen phones, http://hardwaresphere.com/2009/03/09/samsung-s5600-s5230-touchscreen-phones/, Mar. 9, 2009.

International Search Report and Written Opinion issued in International Application No. PCT/EP2012/057944, on Oct. 12, 2012, (10 pages).

International Search Report and Written Opinion issued in International Application No. PCT/IB2011/003273, on Jun. 14, 2012, (8 pages).

International Search Report and Written Opinion mailed Sep. 10, 2012, issued for International Application No. PCT/EP2012/057945 (11 pages).

iPhone User Guide—For iPhone OS 3.1 Software, 2009 (217 pages).

Madhvanath, Sriganesh, HP-Gesture based computing interfaces, Mar. 2008.

Manual del usuario Samsung Moment™ with Google™, dated May 20, 2012 (224 pages).

Merrett, Andy, "iPhone OS 3.0: How to cut, copy and paste text and images", http://www.iphonic.tv/2009/06/iphone_os_30_how_to_cut_copy_a.html, Jun. 18, 2009, XP002684215, (8 pages).

Mobile Tech News—Samsung launches new Gesture Lock touchscreen handsets, http://www.mobiletechnews.com/info/2009/03/11/124559.html, Mar. 3, 2009.

Partial European Search Report; Application No. 10160590.5; Sep. 16, 2010.

Sprint Support Tutorial Set the Screen Lock Pattern—Samsung Moment, http://support.sprint.com/support/tutorial/Set_the_Screen_Lock_Pattern_Samsung_Moment/10887-171, date of access: May 31, 2012 (9 pages).

Sprint Support Tutorial Unlock a Forgotten Lock Pattern—Samsung Moment, http://support.sprint.com/support/tutorial/Unlock_a_Forgotten_Lock_Pattern_Samsung_Moment/10887-339, date of access: May 31, 2012 (7 pages).

Support—Sprint Cell Phones SPH-M900—Samsung Cell Phones, http://www.samsung.com/us/support/owners/product/SPH-M900?tabContent-content2, date of access: May 31, 2012 (1 page).

T-Mobile Forum—Help & How to—Hidden Pattern, http://forums.t-mobile.com/tmbl/board/message?board.id=Android3&message.id=3511&query.id=52231#M3511, Oct. 23, 2008.

T-Mobile Forum—Help & How to—Screen Unlock Pattern, http://forums.t-mobile.com/tmbl/board/message?board.id=Android3&message.id=6015&query.id=50827#M6015, Oct. 22, 2008.

T-Mobile launches the highly anticipated T-Mobile G1, Oct. 22, 2008.

U.S. Office Action dated Oct. 15, 2012, issued in U.S. Appl. No. 13/560,270 (15 pages).

U.S. Office Action dated Oct. 17, 2012, issued in U.S. Appl. No. 13/563,943 (17 pages).

U.S. Office Action dated Oct. 18, 2012, issued in U.S. Appl. No. 13/563,182 (12 pages).

U.S. Office Action dated Oct. 23, 2012, issued in U.S. Appl. No. 12/764,298 (41 pages).

U.S. Office Action dated Oct. 25, 2012, issued in U.S. Appl. No. 13/459,732 (15 pages).

U.S. Office Action dated Oct. 5, 2012, issued in U.S. Appl. No. 13/447,835 (20 pages).

U.S. Office Action dated Sep. 10, 2012, issued in U.S. Appl. No. 13/524,678 (12 pages).

U.S. Office Action dated Sep. 28, 2012, issued in U.S. Appl. No. 13/494,794 (14 pages).

U.S. Office Action for U.S. Appl. No. 12/764,298, dated Jul. 20, 2012, (38 pages).

U.S. Office Action for U.S. Appl. No. 13/482,705, dated Aug. 7, 2012, (10 pages).

User Guide Samsung Moment(TM) with Google(TM), dated Dec. 4, 2009 (122 pages).

User Guide Samsung Moment(TM) with Google(TM), dated Mar. 2, 2010 (218 pages).

"Windows Mobile Café—Software (Freeware): Touchpal, Let's Try Tabbing Up to 300 Chars/Min", Nov. 4, 2007, retrieved from URL:http://windows-mobile-cafe.blogspot.nl/2007/11/software-freeware-touchpal-lets-try.html, accessed online Jan. 18, 2013 (2 pages).

European Partial Search Report dated Jan. 16, 2013, issued in European Application No. 12182612.7 (5 pages).

European Partial Search Report dated Mar. 7, 2013, issued in European Application No. 12184574.7 (5 pages).

Extended European Search Report dated Feb. 28, 2013, issued in European Application No. 12182610.1 (7 pages).

Extended European Search Report dated Jan. 25, 2013, issued in European Application No. 12166520.2 (8 pages).

Extended European Search Report dated Mar. 8, 2013, issued in European Application No. 12182611.9 (8 pages).

Extended European Search Report dated Nov. 22, 2012, issued in European Application No. 12172892.7 (7 pages).

(56) References Cited

OTHER PUBLICATIONS

Extended European Search Report dated Sep. 25, 2012, issued in European Application No. 12176453.4 (7 pages).
Extended European Search Report dated Sep. 25, 2012, issued in European Application No. 12180190.6 (8 pages).
Final Office Action dated Feb. 1, 2013, issued in U.S. Appl. No. 13/563,943 (17 pages).
Final Office Action dated Feb. 28, 2013, issued in U.S. Appl. No. 13/524,678 (21 pages).
Final Office Action dated Jan. 18, 2013, issued in U.S. Appl. No. 13/482,705 (18 pages).
Final Office Action dated Mar. 15, 2013, issued in U.S. Appl. No. 13/572,232 (36 pages).
iPhone J.D. Typing Letters or Symbols That Are Not on the iPhone Keyboard dated Mar. 19, 2010, accessed "http://www.iphonejd.com/iphone_jd2010/03/typing-letters-or-symbols-that-are-not-on-the-iphone-keyboard.html" on Feb. 26, 2013 (3 pages).
Notice of Allowance dated Mar. 15, 2013, issued in U.S. Appl. No. 13/373,356 (25 pages).
Office Action dated Dec. 28, 2012, issued in U.S. Appl. No. 13/459,301 (22 pages).
Office Action dated Jan. 22, 2013, issued in U.S. Appl. No. 13/564,687 (19 pages).
Office Action dated Jan. 29, 2013, issued in U.S. Appl. No. 13/563,182 (19 pages).
Office Action dated Jan. 7, 2013, issued in U.S. Appl. No. 13/564,070 (21 pages).
Office Action dated Jan. 7, 2013, issued in U.S. Appl. No. 13/564,697 (19 pages).
Office Action dated Mar. 12, 2013, issued in U.S. Appl. No. 13/560,796 (22 pages).
Office Action dated Nov. 14, 2012, issued in U.S. Appl. No. 13/572,232 (24 pages).
Office Action dated Nov. 16, 2012, issued in U.S. Appl. No. 13/554,583 (21 pages).
Office Action dated Nov. 8, 2012, issued in U.S. Appl. No. 13/373,356 (18 pages).
Office Action dated Oct. 26, 2012, issued in U.S. Appl. No. 13/554,436 (22 pages).
PCT International Search Report and Written Opinion dated Jan. 24, 2013, issued in International Application No. PCT/CA2012/050274 (9 pages).
PCT International Search Report and Written Opinion dated Nov. 7, 2012, issued in International Application No. PCT/CA2012/050362 (9 pages).
Swype Product Features, accessed online at http://www.swype.com/about/specifications/ on Feb. 25, 2013 (2 pages).
U.S. Appl. No. 13/616,423, filed Sep. 14, 2012 (30 pages).
U.S. Appl. No. 13/773,812, filed Feb. 22, 2013 (94 pages).
Wang, Feng, et al., "Detecting and Leveraging Finger Orientation for Interaction with Direct-Touch Surfaces", UIST '09, Oct. 4-7, 2009, Victoria, British Columbia, Canada (10 pages).
Canadian Office Action dated Aug. 8, 2012, issued in Canadian Application No. 2,688,204 (3 pages).
Canadian Office Action dated Jul. 17, 2014, issued in Canadian Application No. 2,813,393, (4 pages).
Canadian Office Action dated Jul. 3, 2014, issued in Canadian Application No. 2,821,784, (3 pages).
Canadian Office Action dated Jul. 8, 2014, issued in Canadian Application No. 2,793,629, (4 pages).
Canadian Office Action dated Jun. 12, 2014, issued in Canadian Application No. 2,818,720, (3 pages).
Canadian Office Action dated Jun. 12, 2014, issued in Canadian Application No. 2,821,772, (2 pages).
Canadian Office Action dated Jun. 19, 2014, issued in Canadian Application No. 2,821,814, (3 pages).
Canadian Office Action dated Jun. 2, 2014, issued in Canadian Application No. 2,812,033, (3 pages).
Canadian Office Action dated Jun. 25, 2014, issued in Canadian Application No. 2,812,457, (5 pages).
Canadian Office Action dated Jun. 30, 2014, issued in Canadian Application No. 2,819,839, (3 pages).
Canadian Office Action dated Mar. 27, 2013, issued in Canadian Application No. 2,737,314 (3 pages).
Canadian Office Action dated May 13, 2014, issued in Canadian Application No. 2,789,827, (4 pages).
Canadian Office Action dated May 5, 2014, issued in Canadian Application No. 2,803,192, (4 pages).
Distinctive Touch: Gesture-based lightweight identification for touchscreen displays, Electronic Max, Dec. 7, 2004, http://courses.media.mit.edu/2004fall/mas622j/04.projects/students/VanKleek/; accessed online Apr. 27, 2009, pp. 1-11.
Enable or Disable SureType with a RIM BlackBerry Pearl Using Handheld Software, version 4.x, "http://www.wireless.att.com/support_static_files/KB/KB72601.html", at least as early as Feb. 8, 2008 (3 pages).
European Examination Report dated Apr. 11, 2014, issued in European Application No. 12182612.7, (5 pages).
European Examination Report dated Apr. 16, 2014, issued in European Application No. 11192713.3, (7 pages).
European Examination Report dated Apr. 5, 2013, issued in European Application No. 12180190.6 (7 pages).
European Examination Report dated Aug. 22, 2013, issued in European Application No. 12166520.2, (4 pages).
European Examination Report dated Aug. 22, 2013, issued in European Application No. 12173818.1, (6 pages).
European Examination Report dated Dec. 9, 2013, issued in European Application No. 12172458.7, (4 pages).
European Examination Report dated Jun. 2, 2014, issued in European Application No. 12166142.5, (4 pages).
European Examination Report dated Jun. 3, 2014, issued in European Application No. 12172458.7, (5 pages).
European Examination Report dated Mar. 12, 2014, issued in European Application No. 12169649.6, (7 pages).
Extended European Search Report dated Aug. 24, 2012, issued in European Application No. 12172458.7 (6 pages).
Extended European Search Report dated Aug. 27, 2012, issued in European Application No. 12169649.6 (7 pages).
Extended European Search Report dated Dec. 21, 2012, issued in European Application No. 12173818.1, (8 pages).
Extended European Search Report dated Jun. 26, 2013, issued in European Application No. 12184574.7 (10 pages).
Extended European Search Report dated May 6, 2009, issued in European Application No. 09151723.5 (7 pages).
Extended European Search Report dated Nov. 28, 2011, issued in European Application No. 11180985.1 (4 pages).
Final Office Action dated Apr. 11, 2014, issued in U.S. Appl. No. 13/447,704, (15 pages).
Final Office Action dated Apr. 25, 2013, issued in U.S. Appl. No. 13/564,697 (11 pages).
Final Office Action dated Apr. 4, 2013, issued in U.S. Appl. No. 13/447,835 (20 pages).
Final Office Action dated Aug. 29, 2014, issued in U.S. Appl. No. 13/485,723, (18 pages).
Final Office Action dated Dec. 13, 2013, issued in U.S. Appl. No. 13/572,232, (23 pages).
Final Office Action dated Feb. 10, 2014, issued in U.S. Appl. No. 13/485,723, (13 pages).
Final Office Action dated Jul. 2, 2014, issued in U.S. Appl. No. 13/534,101, (15 pages).
Final Office Action dated Jul. 24, 2014, issued in U.S. Appl. No. 13/616,423, (21 pages).
Final Office Action dated Jul. 25, 2013, issued in U.S. Appl. No. 13/560,796, (19 pages).
Final Office Action dated Jul. 28, 2014, issued in U.S. Appl. No. 13/569,000, (13 pages).
Final Office Action dated Jul. 30, 2013, issued in U.S. Appl. No. 13/459,301 (27 pages).
Final Office Action dated Jul. 9, 2013, issued in U.S. Appl. No. 13/564,070 (26 pages).
Final Office Action dated Mar. 26, 2014, issued in U.S. Appl. No. 13/564,697, (9 pages).

(56) References Cited

OTHER PUBLICATIONS

Final Office Action dated May 10, 2013, issued in U.S. Appl. No. 13/459,301 (16 pages).
Final Office Action dated May 15, 2013, issued in U.S. Appl. No. 13/563,182 (21 pages).
Final Office Action dated May 2, 2013, issued in U.S. Appl. No. 13/564,687 (17 pages).
Final Office Action dated May 29, 2012, issued in U.S. Appl. No. 12/362,536 (16 pages).
Final Office Action dated Oct. 26, 2011, issued in U.S. Appl. No. 12/362,536 (21 pages).
Notice of Allowance dated Aug. 12, 2013, issued in U.S. Appl. No. 13/564,687, (10 pages).
Notice of Allowance mailed Oct. 11, 2013, issued in U.S. Appl. No. 13/563,943, (20 pages).
Office Action dated Apr. 11, 2014, issued in U.S. Appl. No. 13/481,171, (12 pages).
Office Action dated Apr. 11, 2014, issued in U.S. Appl. No. 13/572,232, (38 pages).
Office Action dated Apr. 18, 2014, issued in U.S. Appl. No. 13/524,678, (12 pages).
Office Action dated Apr. 21, 2014, issued in U.S. Appl. No. 13/601,736, (19 pages).
Office Action dated Dec. 6, 2013, issued in U.S. Appl. No. 13/564,697, (11 pages).
Office Action dated Jan. 31, 2014, issued in U.S. Appl. No. 13/534,101, (12 pages).
Office Action dated Jul. 21, 2014, issued in U.S. Appl. No. 13/525,576, (19 pages).
Office Action dated Jun. 11, 2014, issued in U.S. Appl. No. 13/563,182, (8 pages).
Office Action dated Jun. 18, 2014, issued in U.S. Appl. No. 13/601,898, (12 pages).
Office Action dated Jun. 8, 2011, issued in U.S. Appl. No. 12/362,536 (19 pages).
Office Action dated Mar. 12, 2014, issued in U.S. Appl. No. 13/616,423, (19 pages).
Office Action dated Mar. 14, 2014, issued in U.S. Appl. No. 13/569,000, (10 pages).
Office Action dated Mar. 26, 2014, issued in U.S. Appl. No. 13/548,469, (11 pages).
Office Action dated May 15, 2014, issued in U.S. Appl. No. 13/482,705, (12 pages).
Office Action dated May 2, 2014, issued in U.S. Appl. No. 13/459,301, (25 pages).
Office Action dated May 21, 2014, issued in U.S. Appl. No. 13/485,723, (18 pages).
Office Action dated May 30, 2013, issued in U.S. Appl. No. 13/572,232 (49 pages).
Office Action dated Nov. 22, 2013, issued in U.S. Appl. No. 13/447,704, (16 pages).
Office Action dated Oct. 17, 2013, issued in U.S. Appl. No. 13/485,723, (28 pages).
PCT International Search Report and Written Opinion dated Nov. 8, 2012, issued in International Application No. PCT/CA2012/050405 (12 pages).
Through the Magic Window—Magic Window word processor for the Apple II, Artsci Publishing, 1980, http://www.artscipub.com/history/magicwindow, accessed May 21, 2013 (5 pages).
Touchpal (combination of two sources: first, youtube video on touchpal at url: http://www.youtube.com/watch?v=eJUWFEXxJaI, dated on Dec. 1, 2011, with screen captures shown below; second, TimesofIndia website article on touchpal at url: http://articles.timesofindia.indiatimes.com/2012-01-29/computing/30673975_1_swype-android-market-qwerty, dated Jan. 29, 2012).

\* cited by examiner

SCORING PREDICTIONS BASED ON PREDICTION LENGTH AND TYPING SPEED

FIELD

Example embodiments disclosed herein relate generally to input methodologies for electronic devices, such as handheld electronic devices.

BACKGROUND

Increasingly, electronic devices, such as computers, netbooks, cellular phones, smart phones, personal digital assistants, tablets, etc., have touchscreens that allow a user to input characters into an application, such as a word processor or email application. Character input on touchscreens can be a cumbersome task due to, for example, the small touchscreen area, particularly where a user needs to input a long message.

DETAILED DESCRIPTION

Reference will now be made in detail to various embodiments, examples of which are illustrated in the accompanying drawings. Wherever possible, the same reference numbers will be used throughout the drawings to refer to the same or like parts.

The present disclosure relates to an electronic device, such as a wired communication device (for example, a laptop computer having a touchscreen) or a mobile/handheld wireless communication device such as a cellular phone, smartphone, wireless organizer, personal digital assistant, wirelessly enabled notebook computer, tablet, or a similar device. The electronic device can also be an electronic device without wireless communication capabilities, such as a handheld electronic game device, digital photograph album, digital camera, or other device.

Predictive text input solutions have been introduced for assisting with input on an electronic device. These solutions include predicting which word a user is entering and offering a suggestion for completing and/or correcting the word.

Throughout this application, the terms "string" and "string of characters" are used interchangeably. Use of the indefinite article "a" or "an" in the specification and the claims is meant to include one or more features that it introduces, unless otherwise indicated. Thus, the term "a predicted string of characters" as used, for example, in "generating a predicted string of characters" can include the generation of one or more predicted strings of characters. Similarly, use of the definite article "the", or "said", particularly after a feature has been introduced with the indefinite article, is meant to include one or more features to which it refers (unless otherwise indicated). Therefore, the term "the predicted string" as used, for example, in "displaying the predicted string" includes displaying one or more predicted strings.

In one embodiment, a method is provided that receives an input, determines, by the processor, a likelihood that a predicted string associated with the received input matches an intended input string, where the determination is a function of at least one of a length of the predicted string and a typing speed associated with the received input, and displaying the predicted string. The predicted string is, for example, the product of a prediction algorithm. This and other embodiments described below provide the user with better predictions of the intended input. Better predictions can improve text input speed, reduce processing cycles and, in some instance, save power.

Figure 1:
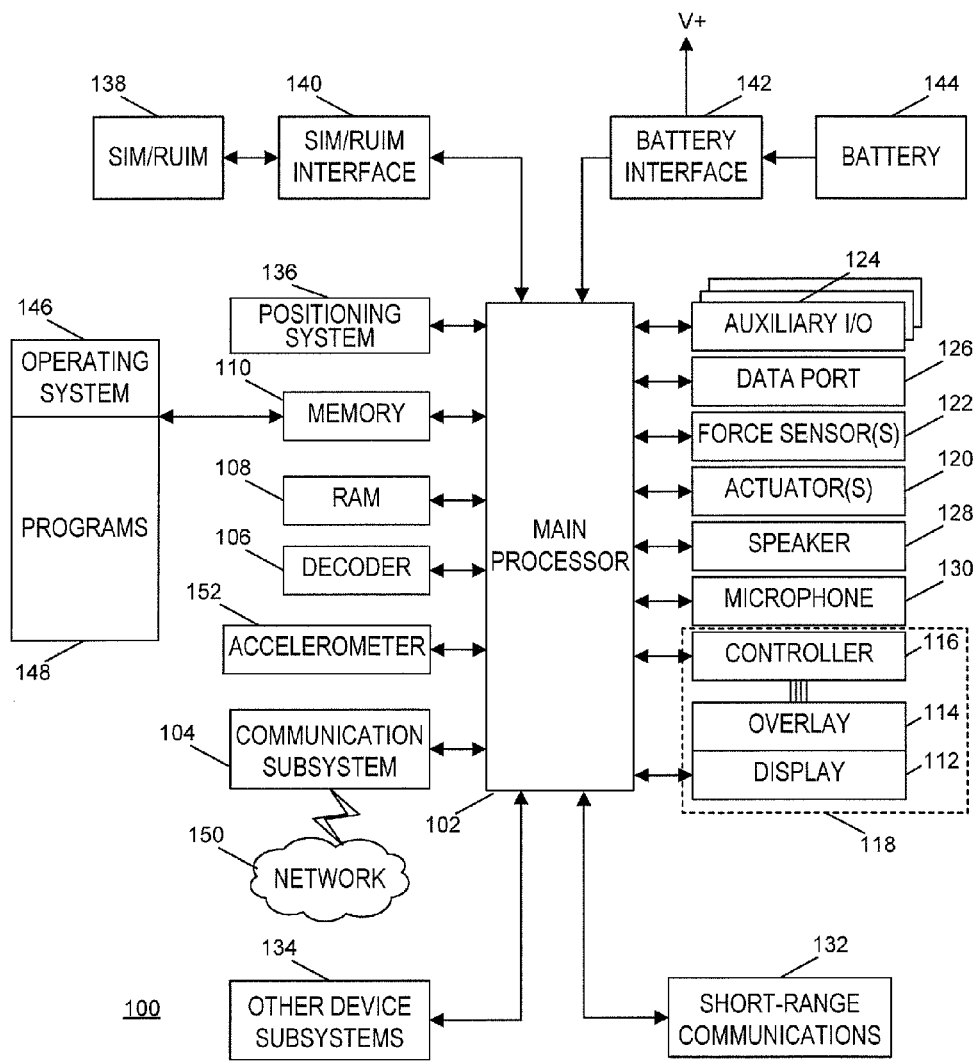
FIG. 1 is an example block diagram of an electronic device, consistent with embodiments disclosed herein.

FIG. 1 is a block diagram of an electronic device 100, consistent with example embodiments disclosed herein. Electronic device 100 includes multiple components, such as a main processor 102 that controls the overall operation of electronic device 100. Communication functions, including data and voice communications, are performed through a communication subsystem 104. Data received by electronic device 100 is decompressed and decrypted by a decoder 106. The communication subsystem 104 receives messages from and sends messages to a network 150. Network 150 can be any type of network, including, but not limited to, a wired network, a data wireless network, voice wireless network, and dual-mode wireless networks that support both voice and data communications over the same physical base stations. Electronic device 100 can be a battery-powered device and include a battery interface 142 for receiving one or more batteries 144.

Main processor 102 is coupled to and can interact with additional subsystems such as a Random Access Memory (RAM) 108; a memory 110, such as a hard drive, CD, DVD, flash memory, or a similar storage device; one or more actuators 120; one or more force sensors 122; an auxiliary input/output (110) subsystem 124; a data port 126; a speaker 128; a microphone 130; short-range communications 132; an accelerometer 152; other device subsystems 134; and a touchscreen 118.

Device 100 includes a man-machine interface, for example, touchscreen 118, which includes a display 112 with a touch-active overlay 114 connected to a controller 116. User-interaction with a graphical user interface (GUI), such as a virtual keyboard rendered on the display 112 as a GUI for input of characters, or a web-browser, is performed through touch-active overlay 114. Main processor 102 interacts with touch-active overlay 114 via controller 116. Characters, such as text, symbols, images, and other items are displayed on display 112 of touchscreen 118 via main processor 102. Characters are inputted when the user touches the touchscreen at a location associated with said character.

Touchscreen 118 is connected to and controlled by main processor 102. Accordingly, detection of a touch event and/or determining the location of the touch event can be performed by main processor 102 of electronic device 100. A touch event includes, in some embodiments, a tap by a finger, a swipe by a finger, a swipe by a stylus, a long press by finger or stylus, a press by a finger for a predetermined period of time, and the like.

While specific embodiments of a touchscreen have been described, any suitable type of touchscreen for an electronic device can be used, including, but not limited to, a capacitive touchscreen, a resistive touchscreen, a surface acoustic wave (SAW) touchscreen, an embedded photo cell touchscreen, an infrared (IR) touchscreen, a strain gauge-based touchscreen, an optical imaging touchscreen, a dispersive signal technology touchscreen, an acoustic pulse recognition touchscreen or a frustrated total internal reflection touchscreen. The type of touchscreen technology used in any given embodiment will depend on the electronic device and its particular application and demands.

When the user touches touchscreen 118, touchscreen 118 can register a two-dimensional imprint of the touch. Touchscreen 118 can analyze the imprint and provide to main processor 102 the (X,Y) coordinates of the center of the touch, the geometrical characteristics of the touch, the pressure applied by the touch, and so forth. The geometrical characteristics include, for example, parameters defining the geometrical shape (e.g., circle, ellipse, square) approximating the touch area.

Main processor 102 can also interact with a positioning system 136 for determining the location of electronic device 100. The location can be determined in any number of ways, such as by a computer, by a Global Positioning System (GPS), either included or not included in electric device 100, through a Wi-Fi network, or by having a location entered manually. The location can also be determined based on calendar entries.

In some embodiments, to identify a subscriber for network access, electronic device 100 uses a Subscriber Identity Module or a Removable User Identity Module (SIM/RUIM) card 138 inserted into a SIM/RUIM interface 140 for communication with a network, such as network 150. Alternatively, user identification information can be programmed into memory 110.

Electronic device 100 also includes an operating system 146 and programs 148 that are executed by main processor 102 and that are typically stored in memory 110. Additional applications may be loaded onto electronic device 100 through network 150, auxiliary I/O subsystem 124, data port 126, short-range communications subsystem 132, or any other suitable subsystem.

A received signal such as a text message, an e-mail message, or web page download is processed by communication subsystem 104 and this processed information is then provided to main processor 102. Main processor 102 processes the received signal for output to display 112, to auxiliary I/O subsystem 124, or a combination of both. A user can compose data items, for example e-mail messages, which can be transmitted over network 150 through communication subsystem 104. For voice communications, the overall operation of electronic device 100 is similar. Speaker 128 outputs audible information converted from electrical signals, and microphone 130 converts audible information into electrical signals for processing.

Figure 2:
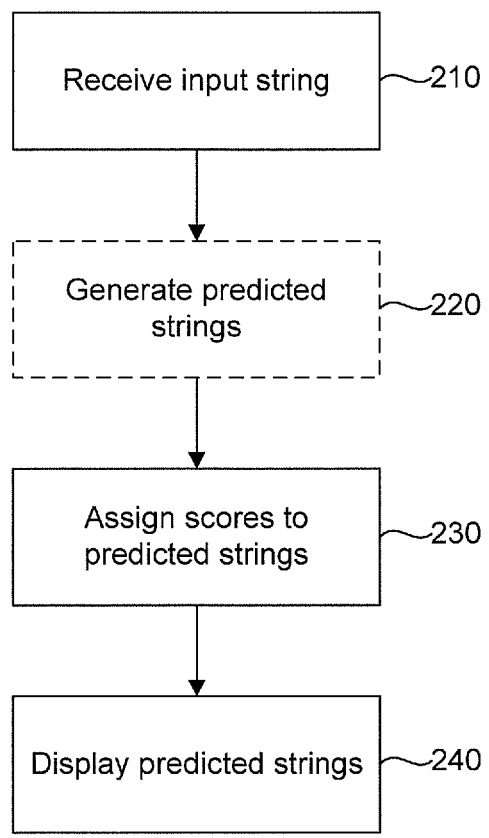
FIG. 2 is a flowchart illustrating an example method for generating predicted strings based on an input, assigning scores to the predicted strings, and displaying the predicted strings based on the assigned scores, consistent with embodiments disclosed herein.

FIG. 2 is a flowchart illustrating an example method 200 for receiving an input, optionally generating a predicted string based on the input, determining a likelihood that a predicted string associated with the received input matches an intended string, and displaying the predicted string, consistent with example embodiments disclosed herein. As used herein, a predictor (such as a predictive algorithm, program, firmware, or a dedicated hardware module) includes a set of instructions that when executed by a processor (e.g., main processor 102), can be used to disambiguate received ambiguous text input and provide various predicted strings (for example, words or phrases, acronyms, names, slang, colloquialisms, abbreviations, or any combination thereof) based on the input. A predictor can also receive otherwise unambiguous text input and generate predicted strings potentially contemplated by the user based on several factors, such as context, frequency of use, and others as appreciated by those skilled in the field.

In an example embodiment, the predictor is one of the programs 148 residing in memory 110 of electronic device 100. Accordingly, method 200 includes a predictor for generating predicted strings corresponding to the input string of characters. It can be appreciated that while the example embodiments described herein are directed to a predictor program executed by a processor, the predictor can be executed, for example, by a virtual keyboard controller.

Method 200 begins at block 210, where the processor (e.g., main processor 102) receives an input string of one or more characters (hereinafter, "input string") from a virtual keyboard displayed on touchscreen 118. As used herein, a character can be any alphanumeric character, such as a letter, a number, a symbol, a punctuation mark, a space, and the like.

At block 220, the processor optionally generates one or more predicted strings such as words or phrases, acronyms, names, slang, colloquialisms, abbreviations, or any combination thereof based on the input string received in block 210. The predicted strings include, for example, strings that are stored in a dictionary of a memory of the electronic device (for example, words or acronyms), strings that were previously inputted by the user (for example, names or acronyms), strings based on a hierarchy or tree structure, a combination thereof, or any strings selected by a processor based on defined arrangement.

In some embodiments, the processor uses contextual data for generating a predicted string. Contextual data considers the context in which the input string is entered. Contextual data can include, for example, information about strings previously inputted by the user, grammatical attributes of the input string (for example, whether a noun or a verb is needed as the next string in a sentence), or any combination thereof. For example, if the string "the" has already been inputted into display, the processor can use the contextual data to determine that a noun or an adjective—instead of a verb—will be the next string after "the". Likewise, if the string "Guy Lafleur played in the National Hockey" was inputted, based on the context, the processor can determine the subsequent string is likely to be "League". Using the contextual data, the processor can also determine whether one or more characters in the input string are incorrect. For example, the processor can determine that the inputted character was supposed to be a "w" instead of an "a", given the proximity of these characters on a QWERTY virtual keyboard. Any known predictive technique or software can be used to process the input string and the contextual data in generating the predicted strings at block 220.

In some embodiments, a predicted string generated at block 220 begins with the input string; in other words, the input string can constitute a prefix (a substring) of the predicted string. For example, if the characters "pl" are received as the input string from a virtual keyboard, the predicted strings generated at block 220 can begin with "pl", and can include "please", "plot", and "place". Similarly, if the user enters the input string "child", the predicted strings generated at block 220 can include "children" and "childish".

In some example embodiments, the processor generates at block 220 predicted strings to which the input string is not a prefix. For example, if the user inputs the string "id", the processor can generate a predicted string "I'd", even though "id" is not a substring of "I'd". As another example, the processor can generate a predicted string "receive" for the input string "reci" (in case the user makes a spelling mistake or a typo). Because the input string does not have to be an exact substring of the predicted string, the user is allowed to make spelling or typing mistakes, use abbreviations, disregard the letter case, and so forth. Thus, the user can significantly increase the typing speed without sacrificing accuracy, by relying on the electronic device to automatically complete the input and correct it, if needed.

In some example embodiments, the predicted strings are not generated by the main processor 102. In these embodiments, main processor 102 provides the input string, for example, to a prediction processor (not shown), which generates predicted strings based on the provided input string, and sends the predicted strings to main processor 102. The prediction processor can be a software- or hardware-based module communicatively coupled to main processor 102. The prediction processor can be either local or remote to electronic device 100.

At block 230, the processor assigns scores (e.g., values) for the predicted strings generated at block 220. A score assigned to a predicted string reflects, for example, a likelihood (probability) that the user intends to input that predicted string, that is, the likelihood that the predicted string is the intended input, given the already inputted input string. A high score can indicate high likelihood, and vice versa, a low score can indicate lower likelihood. In some embodiments, the processor can assign ranks instead of scores. In those embodiments, a lower rank value can indicate a higher rank, that is, a higher likelihood that the predicted string is the input intended by the user.

At block 240, the processor displays one or more of the predicted strings on display 112. The displayed strings can be displayed at or near the input field, on the virtual keyboard (for example, on or near the <space> key or on keys corresponding to characters predicted as the next characters the user might input) or at any other suitable display location. In some embodiments, the processor limits the number of predicted strings that are displayed. For example, the processor can choose to display only a predetermined number (e.g., 1, 3, 10, etc.) of predicted strings that were assigned the highest scores. In embodiments where the processor assigns ranks instead of scores, the processor can choose to display only a predetermined number of highest-ranked predicted strings (e.g., predicted strings with lowest rank values).

Determining the Scores

In some embodiments, the scores assigned to predicted strings at block 230 are determined based on contextual data. For example, the processor can use contextual data (e.g., previously inputted strings) to determine that the input string is more likely to be a noun or an adjective. Accordingly, the processor can assign a higher score to predicted strings that are nouns or adjectives. In some embodiments, contextual data includes information about which programs or applications are currently running or being used by a user. For example, if the user is running an email application, then strings associated with that user's email system, such as strings from the user's contact list, can be used to determine the score of the predicted strings. N-grams, including unigrams, bigrams, trigrams, and the like, can be also used in determining the score.

Additionally, the geolocation of the electronic device or user can be used in the score determination. If, for example, the electronic device recognizes that a user is in an office building, then predicted strings that are generally associated with work can be assigned a higher score. If, on the other hand, the device determines that the user is at the beach, then predicted strings generally associated with the beach can be assigned a higher score.

Score as a Function of a Typing Speed and/or Predicted String Length

In some embodiments, the score assigned to the predicted string at block 230 is determined based on the typing speed of the user inputting the string and/or on the length of the predicted string. For example, if the processor determines that the user is typing fast, the processor can assign a higher score to the longer predicted strings and/or assign a lower score to the shorter predicted strings. Assigning a higher score to a predicted string makes the string more likely to be displayed by the processor at step 240.

When the user is typing fast, displaying a short predicted string may provide little or no benefit to the user, because it may take the user a significant time (e.g., 0.5 seconds) to notice the displayed string, to decide whether or not the displayed string is the intended input, and to select it if it is. Thus, if the user is typing fast (e.g., 4 characters per second), displaying a predicted string that is, for example, only two characters longer than the already typed input string, may not save the user any time. Even if the displayed predicted string is the one contemplated by the user, in the 0.5 seconds that would take the user to notice and select it, the user could simply type in the remaining two characters.

For example, if the user is typing fast and has typed the characters "id", the processor can generate predicted strings "I'd", "idea" and "identify". If the processor did not take typing speed and string length into account, the processor could assign the highest score to "I'd" or to "idea", for example, because these strings are more frequently used than "identify". However, if the user is typing fast, and the processor considers the typing speed and the length of the predicted strings, the processor can assign the highest score to "identify", because it is the only prediction string long enough to potentially save the user some time, as explained above.

In some embodiments, longer predicted strings are assigned higher scores when the typing speed increases, and lower scores when the typing speed decreases. Conversely, shorter predicted strings can be assigned higher scores when the typing speed decreases, and lower scores when the typing speed increases.

In some embodiments, the scores are determined based on the length of the input string. For example, the score can be a function of the typing speed and of the difference between the length of the predicted string and the length of the input string.

In some embodiments, the score depends on the number of character corrections that would be required to change the input string into the predicted string. For example, if the user typed "id" intending to type "I'd", it could take the user as many as five corrections—deleting "d" and "i", and inputting a capital "I", "'", and "d"—to arrive at the intended input.

In some embodiments, the score determination includes thresholds such as a length threshold and/or a speed threshold. For example, the processor can decrease the scores of predicted strings that are not longer than the input string by at least a certain length threshold. In some embodiments, such predicted strings can be assigned a predetermined score that would indicate to the processor not to display those strings.

In some embodiments, if the predicted strings are longer than the input string by at least the length threshold, the scores of such strings will not take into account the absolute length of the predicted string. In other words, in these embodiments, the score does not depend on the length of the predicted string as long as the predicted string is longer than the input string by the length threshold.

In some embodiments, the length threshold is a predetermined value, such as 0, 1, 3, etc. In other embodiments, the length threshold is a function of the typing speed. For example, the length threshold can be in direct relationship with the typing speed, that is, the length threshold increases when the typing speed increases, and the length threshold decreases when the typing speed decreases. For example, the threshold can reflect the number of characters that the user, maintaining the same typing speed, would type within a "reaction" time period. The reaction time period is, for example, the time period that would take an average user to notice the displayed predicted string, read it, decide whether or not it is the intended string, and select it if it is. In some embodiments, the reaction time period is a predetermined time period, such as 0.3 seconds, 0.5 seconds, 1 second, etc. In other embodiments, the reaction time period can be determined dynamically, for example, by checking how long it took the user to react to one or more previously displayed predicted strings.

In some embodiments, the score also depends on a predetermined speed threshold. For example, the score can be independent from the length of the predicted string if the typing speed is below the predetermined speed threshold. In other words, when the user is typing very slowly, the score may not take the length of the predicted strings into account at all.

The typing speed can be defined and measured by the processor using any suitable means. In some embodiments, the typing speed is defined, for example, as the average or median speed (e.g., in characters per second) over the last O inputted characters, last P words, last Q seconds, or any combination thereof, where O, P, and Q can be different predetermined numbers. In some embodiments, the typing speed is determined by combining the short-term speed (the speed with which the last several characters were typed) with the long-term speed (for example, the average speed across the entire input text).

Figure 3:
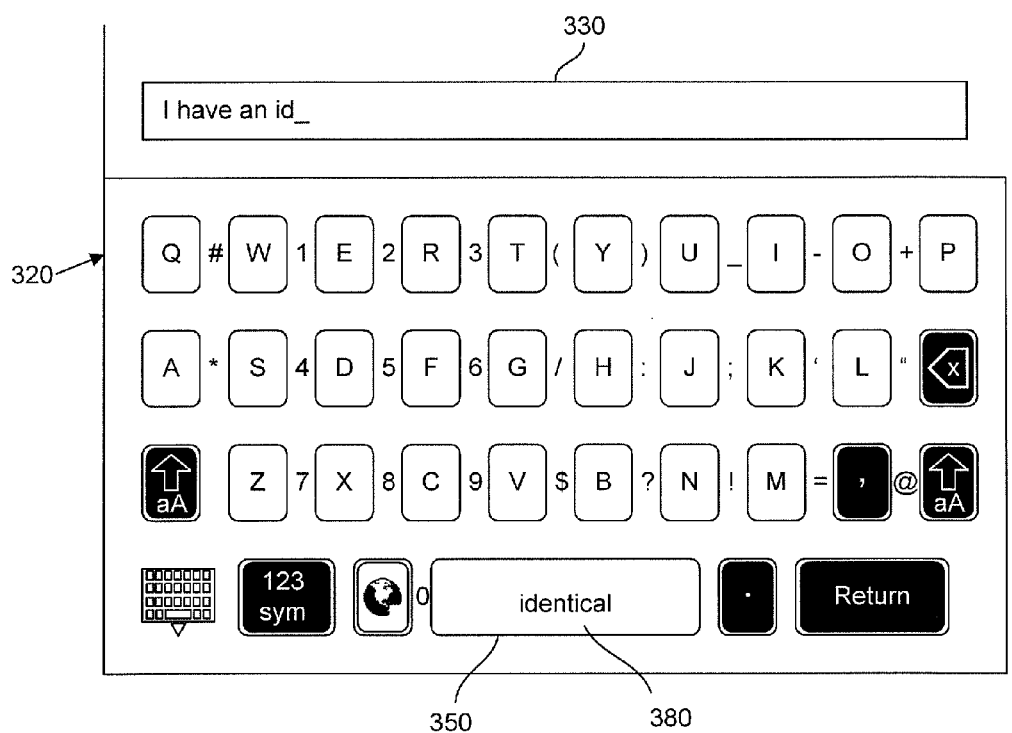
FIG. 3 shows an example front view of a touchscreen, consistent with embodiments disclosed herein.

FIG. 3 illustrates an example front view of touchscreen 118 having a virtual keyboard 320, consistent with example embodiments disclosed herein. The position of the virtual keyboard 320 is variable such that virtual keyboard 320 can be placed at any location on touchscreen 118. Touchscreen 118 includes two areas: (1) an input field 330 that displays characters inputted by the user and (2) the virtual keyboard 320 that receives the input from the user. As shown in FIG. 3, touchscreen 118 displays a virtual keyboard 320 having a standard QWERTY layout; however, any keyboard layout can be displayed for use in the device, such as AZERTY, QWERTZ, or a layout based on the International Telecommunication Union (ITU) standard (ITU E.161) having "ABC" on key 2, "DEF" on key 3, and so on. Virtual keyboard 320 includes a space key 350 as well as other keys that can provide different inputs, such as punctuation, letters, numbers, enter or return keys, and function keys.

As shown in FIG. 3, the user has already inputted the text "I have an id" which appears at input field 330. The processor receives (210) the input string "id", and generates (220) predicted strings based on the input string. For example, the processor generates the following predicted strings: "ID", "I'd", "idea", "identify", "identical", "ideological". The processor then assigns (230) scores to the two predicted strings.

The processor can first assign scores based on factors other than typing speed and string lengths. For example, the processor assigns scores based on the contextual data, N-gram data, and geolocation data, as described above, and assigns the following scores, first:

| Predicted String | Score |
|---|---|
| idea | 0.65 |
| ID | 0.4 |
| identical | 0.35 |
| ideological | 0.28 |
| I'd | 0.1 |
| identify | 0.1 |

The scores can, but do not have to, be normalized so that the sum of all the scores equals 1, in which case each score can represent a probability that the corresponding predicted string is the one intended by the user. In the above example, "I'd" and "identify" are assigned very low scores, for example, because the processor predicts that after entering an article "an" the user is inputting either a noun or an adjective.

The processor then considers the typing speed and the length of each prediction string, and adjusts the scores accordingly. Assuming, for example, that the user is typing at a speed of 4 characters per second, and that a predetermined reaction time period is 0.5 seconds, the processor can determine the length threshold to be 4×0.5=2 (indicating that at the current typing speed the user can type 2 characters within the reaction time period). Next, the processor can determine the difference in length between each predicted string and the input string "id". In this example, the length differences would be: idea(2), ID(0), identical(7), ideological(9), I'd(1), and identify(6). Consequently, processor can decrease the scores of all prediction strings whose length difference is not above the length threshold ("idea", "ID" and "I'd"), for example, by 2. The resulting scores would then become:

| Predicted String | Score |
|---|---|
| idea | 0.65/2 = 0.325 |
| ID | 0.4/2 = 0.2 |
| identical | 0.35 |
| ideological | 0.28 |
| I'd | 0.1/2 = 0.05 |
| identify | 0.1 |

In some embodiments, scores of short predicted strings can be decreased by a predetermined percentage, by a predetermined value, or set at a predetermined value indicating to the processor that the strings should not be displayed at all.

The processor can then either increase the scores of the remaining (longer) predicted strings in accordance with their length, or keep their scores unchanged. In the above example, they are unchanged, and the predicted string "identical" emerges as the predicted string with the highest score.

The processor displays (240) one or more predicted strings on touchscreen 118. In this example, the processor is configured to display only the predicted string that was assigned the highest score. Therefore, the predicted string "identical" 380 is displayed on space key 350. The user can then input (select) the predicted string, for example, by pressing the space key 350. When the user inputs the predicted string, the processor can, for example, replace the input string "id" with the inputted predicted string "identical" at input field 330.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Certain features which, for clarity, are described in this specification in the context of separate embodiments, may also be provided in combination in a single embodiment. Conversely, various features which, for brevity, are described in the context of a single embodiment, may also be provided in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Other embodiments of the invention will be apparent to those skilled in the art from consideration of the specification and practice of the invention disclosed herein. It is intended that the specification and examples be considered as examples only, with a true scope and spirit of the invention being indicated by the following claims.

What is claimed is:

1. An input method for a communication device having a hardware processor, the method comprising:
    receiving, through a virtual keyboard displayed on a touchscreen of the communication device, an input string;
    determining a typing speed associated with the received input;
    generating, by the hardware processor, predicted strings stored in a dictionary memory of the communication device, where contextual data is sued when generating the predicted string;
    assigning, by the hardware processor, a higher likelihood to longer predicted strings associated with the received input matches an intended input string when a typing speed associated with the received input increases;
    assigning, to the predicted string, a score associated with the determined likelihood, wherein the score is independent of the length of the predicted string if the typing speed is below a predetermined speed threshold;
    determining whether to display the predicted string based at least on the score;
    displaying, on virtual keyboard of the communication device, one or more predicted strings at or near the input string and based on the determined likelihoods of the predicted strings; and
    determining, by the hardware processor, whether one of the predicting strings matched the intended input string based on user input or omission of user input within a predetermined period of time.

2. The method of claim 1, further comprising decreasing the score if the difference between the length of the predicted string and the length of the input is smaller than a length threshold.

3. The method of claim 1, wherein the length threshold is a function of a reaction time.

4. The method of claim 1, wherein the length threshold is a function of the typing speed.

5. The method of claim 1, wherein the length threshold is in direct relationship with the typing speed.

6. The method of claim 1, further comprising measuring the typing speed by calculating an average typing speed across a predetermined number of input characters.

7. An electronic device comprising a display and a hardware processor, the hardware processor configured to perform:
    receiving, through a virtual keyboard displayed on a touchscreen of the communication device, an input string;
    determining a typing speed associated with the received input;
    generating, by the hardware processor, predicted strings stored in a dictionary memory of the communication device, where contextual data is sued when generating the predicted string;
    assigning, by the hardware processor, a higher likelihood to longer predicted strings associated with the received input matches an intended input string when a typing speed associated with the received input increases;
    assigning, to the predicted string, a score associated with the determined likelihood, wherein the score is independent of the length of the predicted string if the typing speed is below a predetermined speed threshold;
    determining whether to display the predicted string based at least on the score;
    displaying, on virtual keyboard of the communication device, one or more predicted strings at or near the input string and based on the determined likelihoods of the predicted strings; and
    determining, by the hardware processor, whether one of the predicting strings matched the intended input string based on user input or omission of user input within a predetermined period of time.

8. The electronic device of claim 7, wherein the processor is further configured to perform:
    decreasing the score if the difference between the length of the predicted string and the length of the input is smaller than a length threshold.

9. The electronic device of claim 7, wherein the length threshold is a function of a reaction time.

10. The electronic device of claim 7, wherein the length threshold is a function of the typing speed.

11. The electronic device of claim 7, wherein the length threshold is in direct relationship with the typing speed.

12. The electronic device of claim 7, wherein the processor is further configured to perform:
    measuring the typing speed by calculating an average typing speed across a predetermined number of input characters.

* * * * *